(12) United States Patent
Cox et al.

(10) Patent No.: US 9,120,565 B2
(45) Date of Patent: Sep. 1, 2015

(54) METHOD FOR ENHANCING PILOT EFFICIENCY AND AIRCRAFT SAFETY DURING GROUND TRAVEL

(75) Inventors: Isaiah W. Cox, Baltimore, MD (US);
Rodney T. Cox, North Plains, OR (US);
Joseph J. Cox, Portland, OR (US);
Joseph Goldman, Pikesville, MD (US)

(73) Assignee: Borealis Technical Limited, Gibraltar (GI)

(*) Notice: Subject to any disclaimer, the term of this patent is extended or adjusted under 35 U.S.C. 154(b) by 361 days.

(21) Appl. No.: 13/550,576

(22) Filed: Jul. 16, 2012

(65) Prior Publication Data

US 2013/0062459 A1 Mar. 14, 2013

Related U.S. Application Data

(60) Provisional application No. 60/508,269, filed on Jul. 15, 2011.

(51) Int. Cl.
*B64C 25/32* (2006.01)
*B64C 25/40* (2006.01)

(52) U.S. Cl.
CPC .............. *B64C 25/405* (2013.01); *Y02T 50/823* (2013.01)

(58) Field of Classification Search
USPC .......................................................... 244/50
See application file for complete search history.

(56) References Cited

U.S. PATENT DOCUMENTS

| | | | | |
|---|---|---|---|---|
| 3,762,670 A | * | 10/1973 | Chillson | 244/50 |
| 3,807,664 A | * | 4/1974 | Kelly et al. | 244/50 |
| 3,874,619 A | * | 4/1975 | Collins et al. | 244/50 |
| 3,977,631 A | * | 8/1976 | Jenny | 244/50 |
| 6,305,484 B1 | | 10/2001 | Leblanc | |
| 6,657,334 B1 | | 12/2003 | Edelson | |
| 6,838,791 B2 | | 1/2005 | Edelson | |
| 6,928,363 B2 | | 8/2005 | Sankrithi | |
| 7,116,019 B2 | | 10/2006 | Edelson | |
| 7,445,178 B2 | | 11/2008 | McCoskey et al. | |
| 7,469,858 B2 | | 12/2008 | Edelson | |
| 7,891,609 B2 | | 2/2011 | Cox | |
| 8,474,749 B2 | * | 7/2013 | Cros et al. | 244/50 |
| 8,485,466 B2 | * | 7/2013 | Charles et al. | 244/50 |
| 8,668,165 B2 | * | 3/2014 | Rotger et al. | 244/111 |
| 2009/0218440 A1 | * | 9/2009 | Dilmaghani et al. | 244/50 |
| 2009/0261197 A1 | * | 10/2009 | Cox et al. | 244/50 |
| 2010/0276535 A1 | * | 11/2010 | Charuel et al. | 244/50 |
| 2011/0198439 A1 | * | 8/2011 | Rotger et al. | 244/50 |
| 2011/0290933 A1 | * | 12/2011 | Cros et al. | 244/50 |
| 2012/0104158 A1 | * | 5/2012 | Charles et al. | 244/50 |
| 2012/0104159 A1 | * | 5/2012 | Charles et al. | 244/50 |
| 2013/0200210 A1 | * | 8/2013 | Oswald et al. | 244/50 |

FOREIGN PATENT DOCUMENTS

WO    WO 2011134503 A1   *  11/2011

* cited by examiner

*Primary Examiner* — Joseph W Sanderson

(57) ABSTRACT

A method for enhancing pilot and cockpit crew efficiency and increasing aircraft safety during aircraft ground travel between landing and takeoff is provided. The present method is most effective in enhancing pilot efficiency and aircraft safety in an aircraft equipped with at least one powered, self-propelled drive wheel that drives the aircraft on the ground independently of the aircraft main engines or external tow vehicles that is controlled by the pilot and cockpit crew to maneuver the aircraft during ground travel.

5 Claims, 2 Drawing Sheets

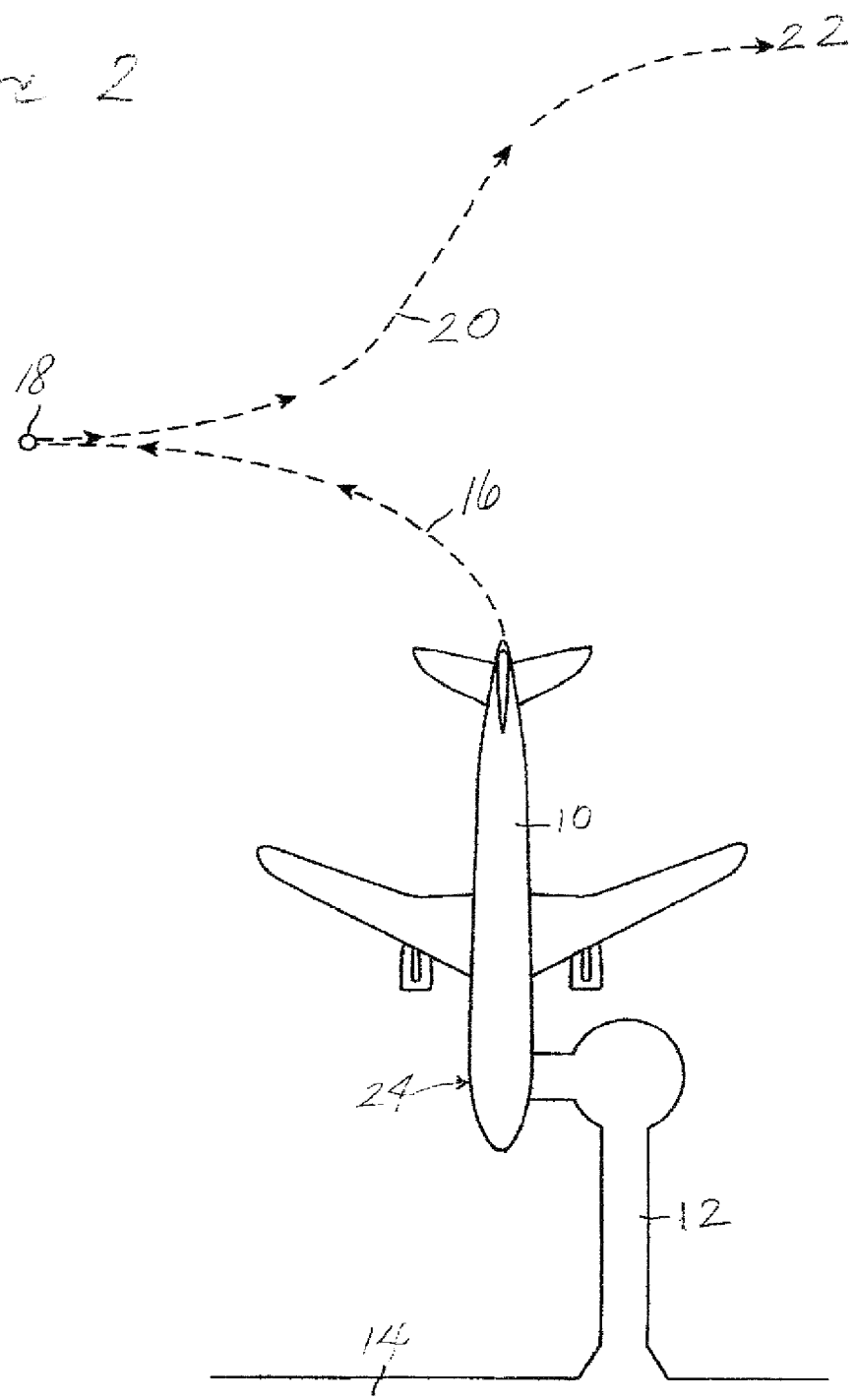

METHOD FOR ENHANCING PILOT EFFICIENCY AND AIRCRAFT SAFETY DURING GROUND TRAVEL

PRIORITY CLAIM

This patent application claims priority from U.S. Provisional Application No. 61/508,269, filed Jul. 15, 2011, the disclosure of which is incorporated herein.

TECHNICAL FIELD

The present invention relates generally to procedures employed by pilots, cockpit crew, and ground and air traffic control for maneuvering aircraft on the ground between landing and takeoff and, specifically, to a method that improves pilot efficiency and enhances aircraft safety while an aircraft is driven on the ground.

BACKGROUND OF THE INVENTION

The operation of airlines and airports today focuses on achieving maximum efficiency to keep operating costs as low as possible while continuing to provide travelers with a safe and economical mode of travel. It is desired to keep the time an aircraft spends on the ground at an airport between landing and takeoff, more specifically between arrival at and departure from the gate, to the minimum required to unload arriving passengers and cargo, service the aircraft, and load departing passengers and cargo. Minimizing the time an aircraft spends on the ground or is engaged in ground maneuvers not only reduces delays in airline flight schedules, but also increases the possibility that an airline can schedule additional flights, providing travelers with more options and improving airline profits. Increased airport ground traffic, however, may be accompanied by an increased risk of ground incidents involving aircraft, ground vehicles, and even passengers and ground personnel. Consequently, reducing aircraft ground time should not be at the expense of increased ground safety risks.

Multiple airlines conduct both pushback and landing operations for multiple aircraft virtually simultaneously. This strains not only the available towing and other ground operations equipment, but also the available ground personnel. Aircraft ground time can be increased significantly when tow bars, adapters, tugs, or ground crews are not available when needed at taxi-in or pushback. Neither the airline nor the flight crew has any control over this situation. Moreover, if an aircraft is damaged during taxi-in or pushback or causes damage to another aircraft in a congested ramp environment, and the damage is not detected prior to takeoff because the cockpit crew's attention was focused in the cockpit on checklists or other procedures or ground crew were busy elsewhere, aircraft safety could be compromised.

Ramp congestion caused by increasing numbers of flights, stringent aircraft scheduling requirements, and efforts to squeeze large jets into gates originally designed for much smaller aircraft contributes to traffic jams and reduced maneuvering space in the ramp area. Some studies have indicated that the location of most of the incidents resulting in damage that occur during aircraft ground travel happen at the ramp entry or exit area. At this location, taxi lines leading into and out of the gate area converge, and an aircraft is less likely to be in communication with air traffic or other controllers. Pilots and other flight crew are more likely at this point to be relying on an airline's ramp control procedure or ground crew input for guidance. The largest percentage of incidents in one study occurred within 20 feet of the nose wheel parking line, within the gate stop area, when the flight crew is typically relying entirely on ground crew guidance and signals from ground crew or elsewhere for clearance from obstacles and for final taxi instructions. Noise from operating aircraft engines may also interfere with communications between flight crew and ground personnel.

One study found that more incidents occur during aircraft arrival than during departure. One possible explanation for this is that there may be more obstacles for an aircraft to encounter when entering the congested area next to gates and terminal buildings. Another reason may be related to the large number of pushback, power-out, and power-turn procedures that are conducted during departure operations while incoming aircraft are trying to maneuver into gates or other parking areas. Damage to ground vehicles and other aircraft, especially where taxiing aircraft share a common maneuvering area, and injuries to people, mainly ground personnel but occasionally passengers, can also occur. The personal injuries notwithstanding, financial and other losses to an airline from such incidents are potentially substantial.

In addition to ramp collision incidents such as those described above, ground safety can be significantly compromised by the jet blast from an aircraft jet engine, as well as by the potential for engine ingestion when aircraft engines are kept in operation, even at idle speeds, within the ramp area. The addition of jet blast, also known as jet efflux, or engine ingestion created by an aircraft taxiing into a congested ramp area with one or more engines operating virtually guarantees that, at some time, something will be damaged or someone will be injured.

Jet blast data, measured from an aircraft's tail with the engines at low RPM settings, indicate that the damage profile can extend from the outboard wing-mounted engines to more than 200 feet beyond some larger aircraft. Within this area, jet engines can generate hurricane-level exhaust forces of almost 100 knots. Most of the reported jet blast damage incidents typically occur in the ramp area during pushback, powerback, taxi-out, or taxi-in. The position of the operating jet engines relative to gates, ground equipment, people, and other aircraft, especially smaller light aircraft, when breakaway power is applied can significantly influence the occurrence of jet blast or engine ingestion damage incidents. Because aircraft with engines powered while in the process of turning are frequently involved in such incidents, using powered engines to maneuver an aircraft without assistance from a tow vehicle is highly likely to compromise ramp and ground safety. The presence of a tow vehicle, however, is not likely to prevent damage if an aircraft's engines are running and the aircraft is in the process of making a sharp turn. Careful management of an engine-powered aircraft moving on the ground is required, particularly on congested ramps not designed for large aircraft. A pilot (and ground control) maneuvering an aircraft under such conditions must be aware of the potential jet blast and engine ingestion damage area when directing the ground movements of aircraft with operating engines. Ensuring safety is difficult under these circumstances.

Positioning a jet aircraft so that the engine forward thrust is directed away from gate areas, people, and ramp equipment and the jet blast is not directed into the gate area is helpful, but the direction of the jet blast can change as the aircraft is maneuvered into or out of the gate. This occurs, for example, during powerback operations, when the flight crew employs engine thrust reversers to direct thrust ahead of the aircraft to push the aircraft backward, changing the direction of the jet blast. Damage to other aircraft, especially small aircraft, ground vehicles, and personnel, remains a distinct possibility as long as an aircraft's engines are running. Suggestions for minimizing the hazards associated with jet blast and engine ingestion have helped somewhat, but both continue to present significant safety challenges in ground areas where an aircraft's engines are in operation during ground operations.

The pilot and cockpit crew are required by agencies that regulate air traffic to follow very specifically defined procedures during landing and takeoff, as well as during the period when an aircraft is travelling on the ground between landing and takeoff. These procedures are, by necessity, designed to ensure that aircraft landings, takeoffs, and ground maneuvers are as safe and efficient as possible. As noted above, increased airport ground congestion can present significant safety challenges to the pilot and cockpit crew during aircraft ground travel. Ideally, pilots must be aware of runway, taxiway, ramp, and gate environments at all times. Their awareness of these areas outside their aircraft must be especially focused, however, when there are other aircraft and ground vehicles present. Unfortunately, particularly following pushback, the pilot and other cockpit crew members are required to focus on checklists and activities internally within the cockpit related to pushback and engine start rather than the external environment. Consequently, the heads and eyes of the cockpit crew tend to be directed down into the cockpit as these tasks are performed, which can decrease their awareness of other vehicles and persons in the aircraft's immediate path of travel. Some of the safety issues discussed above could occur as a result.

Pilots must currently perform required sequences of procedures upon landing and taxi-in to a parking location and then upon pushback from the parking location, taxi-out, and takeoff. The sequences of these procedures are premised upon either the availability of a tow vehicle to move the aircraft on the ground when the engines are not operating or upon the operation of the engines to enable ground movement of the aircraft. The hazards of operating aircraft engines in a ramp or gate environment have been discussed above. Tugs present their own challenges to efficient aircraft ground movement. Neither situation enhances pilot efficiency or aircraft safety.

The movement of tugs generally contributes to ground vehicle traffic and congestion. Tugs also must be monitored to keep track of their locations so they may be moved to a required location by the time a tug is needed to pushback a departing aircraft. Although pilot controlled and remotely controlled tugs are disclosed in the art, for example in U.S. Pat. No. 6,928,363 to Sankrithi and U.S. Pat. No. 6,305,484 to Leblanc, respectively, such tugs are not widely available, and a ground crew team is still required to monitor and move tugs and to carry out the pushback process. The use of tow vehicles, moreover, increases the list of procedures a pilot must perform and monitor, as well as the time an aircraft is on the ground.

In addition, since the pilot and cockpit crew are focused on pushback procedures relating to movement of the air craft by the tug, the ground crew must ensure that no part of an aircraft structure will impact any fixed object or other aircraft or vehicle. The size of the ground crew required when an aircraft is moved into or out of the ramp or gate area by a tow vehicle typically increases over that required when an aircraft uses its engines for ground movement. Ground crew are also required to return tow vehicles from the location where they are detached from the aircraft to the gate area for reuse with another aircraft. This system is not a particularly efficient one.

A system and method for reducing turnaround time of an aircraft is described in U.S. Pat. No. 7,891,609 to Cox et al, owned in common with the present application. The system and method described therein suggests that aircraft turbines may be turned on only when needed and are turned off until takeoff or after landing. The aircraft is moved along taxiways using at least one self-propelled undercarriage wheel. This method focuses on reducing turnaround times by having all of the required equipment available for turnaround and departure and minimizing the use of motorized tugs while providing an enhanced communication system between the pilot and ground personnel. McCoskey et al, in U.S. Pat. No. 7,445,178, describes a powered nose aircraft wheel system useful in a method of taxiing an aircraft that can minimize the assistance needed from tugs and the aircraft engines. A precision guidance system is disclosed for controlling movement of the aircraft on the ground to minimize collision damage during taxi. Neither of the foregoing patents acknowledges or otherwise recognizes that pilot and/or cockpit efficiency or aircraft safety is affected by the systems described therein.

The prior art, therefore, does not disclose a method of improving or enhancing pilot efficiency and aircraft safety during aircraft ground travel or during aircraft ground travel in an aircraft driven independently on the ground by at least one powered self-propelled drive wheel.

SUMMARY OF THE INVENTION

It is a primary object of the present invention, therefore, to overcome the deficiencies of the prior art and to provide a method of improving or enhancing pilot efficiency and aircraft safety during aircraft ground travel between landing and arrival at a parking location and between departure from the parking location and takeoff.

It is another object of the present invention to provide a method of improving or enhancing pilot efficiency during aircraft ground travel between landing and takeoff when an aircraft is driven independently on the ground by at least one powered self-propelled drive wheel.

It is an additional object of the present invention to provide a method for improving or enhancing efficient cockpit operations during aircraft ground travel between landing and takeoff.

It is a further object of the present invention to provide a method for improving the safety of aircraft ground maneuvers between landing and takeoff by enhancing pilot and cockpit crew efficiency.

It is yet another object of the present invention to provide a method for enhancing pilot efficiency that results in pilot and cockpit crew increased situational awareness during aircraft ground travel.

It is yet an additional object of the present invention to provide a method for increasing pilot efficiency during ground travel in an aircraft driven by at least one powered, self-propelled drive wheel that provides maximum flexibility for performing checklist procedures.

In accordance with the aforesaid objects, a method for increasing and enhancing pilot and cockpit crew efficiency and aircraft safety during aircraft ground travel is provided. The present method is most effective in enhancing cockpit crew efficiency and aircraft safety in an aircraft equipped with at least one powered, self-propelled drive wheel that drives the aircraft on the ground independently of the aircraft main engines or external tow vehicles and is controlled by the pilot and/or cockpit crew. The present method can be employed when the aircraft is driven on the ground between landing and takeoff. Upon landing, the aircraft main engines are shut down completely, and a powered, self-propelled drive wheel motor assembly is activated to begin pilot control of ground movement of the aircraft on the taxiway. The pilot completely controls the forward movement of the aircraft with the powered self-propelled drive wheel until the aircraft arrives at a designated parking location, when the drive wheel motor assembly is inactivated, causing the aircraft to stop. Passengers and baggage are unloaded and the aircraft serviced for departure as soon as the aircraft stops. After passengers and baggage for the departing flight have been loaded, the pilot activates the powered, self-propelled drive wheel motor assembly and drives the aircraft in reverse away from the parking location, turns the aircraft as required, and then drives the aircraft to a taxiway for takeoff. The pilot turns on the aircraft main engines only when the aircraft is approaching a runway for takeoff.

Other objects and advantages will be apparent from the following description, claims, and drawings.

BRIEF DESCRIPTION OF THE DRAWINGS

FIG. 2 is a top view of an aircraft equipped with at least one powered self-propelled drive wheel parked at an airport gate showing a path along which the aircraft will be efficiently driven on the ground without the aircraft engines or a tow vehicle by a pilot and cockpit crew between departure from the gate and takeoff according to the method of the present invention.

DESCRIPTION OF THE INVENTION

Figure 1:
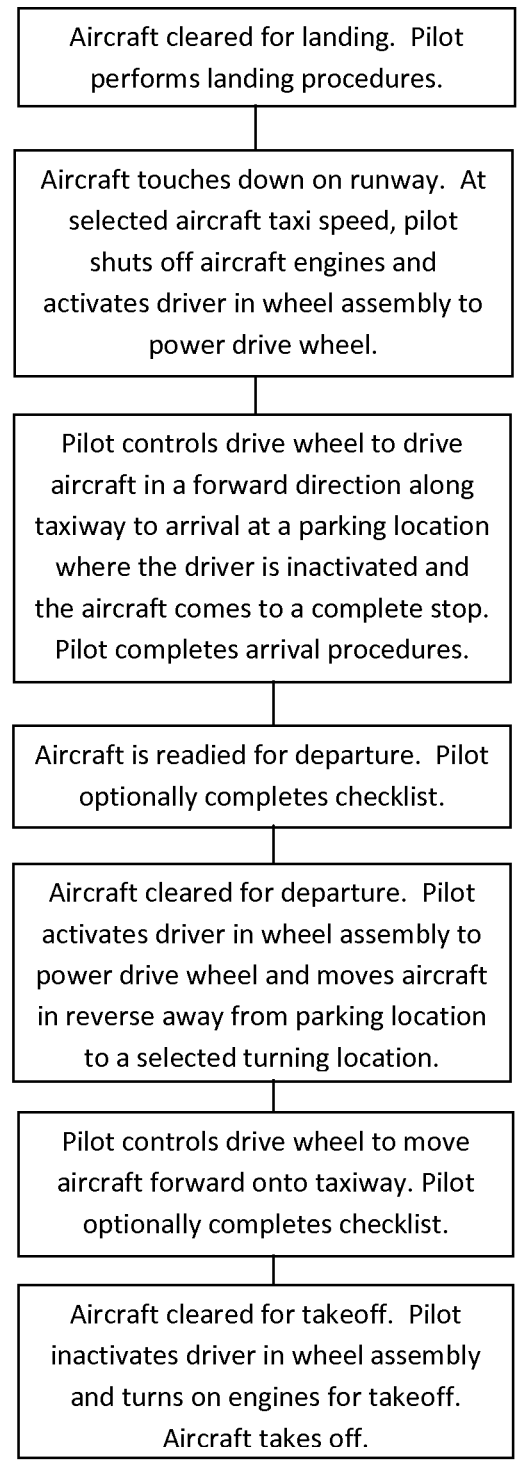
FIG. 1 presents a flow chart showing one possible sequence of steps leading to enhanced pilot efficiency and aircraft safety in accordance with the present invention.

The method for increasing and enhancing pilot and cockpit crew efficiency and aircraft safety during aircraft ground travel of the present invention provides significant advantages and efficiencies for airline and airport operation. The ground travel of the aircraft is completely controlled by the pilot and/or cockpit crew in conjunction with ground and air traffic control, as required. The pilot and cockpit crew are free to focus primarily on the aircraft external environment during ground travel. This improved situational awareness of the driven aircraft in relation to other aircraft, ground vehicles, and structures in the taxiway, ramp, and gate areas can significantly reduce the likelihood of incidents in these areas. Tugs, tow bars, and tug adaptors are not required, which significantly reduces the requirement for these ground vehicles and equipment and the personnel needed to attach, detach, and retrieve them. Moreover, aircraft will not be required to wait for this equipment before beginning any type of airport ground movement. A smaller number of ground crew personnel will be needed to communicate with the flight crew and to oversee arrival, pushback, and other aircraft ground movement. Fuel savings will be realized for both airport operators, who no longer need to supply fuel for tugs, and for airlines, who can reduce significantly the amount of time aircraft main engines must run while the aircraft is on the ground. The elimination of foreign object debris, jet blast, and engine ingestion increases gate, ramp, and taxiway safety. Noise in these areas is also significantly reduced when aircraft main engines are not operating, which increases pilot and cockpit crew efficiency by improving communication. Additionally, the increase in pilot and cockpit crew operational efficiency possible with the method of the present invention has potentially significant cost savings associated with it.

Currently, as an aircraft approaches its destination, the cockpit crew is required to follow established descent and approach and then landing procedures and checklists. During the landing roll, the autopilot is disengaged so the aircraft is controlled manually. The engine thrust levers are initially at idle, then reverse thrust is applied until taxi speed is reached, when reverse thrust is reduced to idle. Prior to reaching taxi speed, the autobrake is inactivated, and the brakes are controlled manually. The pilot and crew must then manually guide the aircraft, using one or more of the aircraft's main engines, to a parking location. The aircraft main engines can be turned off only when the aircraft has come to a stop at the parking location or other destination. As long as the aircraft engines are running, the safety hazards described above are created. The pilot and crew must constantly be aware of persons, vehicles, and objects within the range where injury or damage from jet blast, engine ingestion, and foreign object debris can occur as the aircraft is driven to its parking location with one or more engines in operation. Because this range can be extensive, it is very difficult to avoid such incidents in a congested ramp or gate area. The method of the present invention eliminates their occurrence.

Pilot efficiency is improved upon landing an aircraft with the present method because the aircraft's travel after landing upon reaching taxi speed is not controlled by the main engines, but by at least one self-propelled drive wheel, preferably powered by the aircraft's auxiliary power unit (APU), that is controlled by the cockpit crew. The pilot and crew activate the drive wheel and control its operation from the cockpit to maneuver the aircraft from the taxiway where it has landed to its parking destination. The pilot can direct ground travel of the aircraft without having to gauge whether persons or vehicles on the ground are within the hazard range of an operating engine, therefore enhancing the safe maneuverability of the aircraft. The pilot and cockpit crew can maintain the required vigilance and situational awareness of other aircraft, ground vehicles, and persons outside the aircraft while moving more efficiently through a crowded airport ramp or gate area. Communication between ground control and the cockpit can be conducted more effectively without the noise produced by operating engines. Moreover, passengers, crew, and cargo can safely leave the aircraft as soon as it comes to a stop at the parking location, which helps to minimize the time the aircraft spends on the ground.

The procedures followed by the pilot and crew between departure from a parking location, generally referred to as pushback procedures, and takeoff are more involved than those required upon landing and arrival at a parking location. Upon landing, an aircraft moves in a forward direction until it reaches its parking location. During the vast majority of departures, an aircraft must travel in a reverse direction while turning so it can then move in a forward direction to a taxiway for takeoff. If the aircraft's engines are not used to move it in reverse, attachment to a tow vehicle is required to push the aircraft back from a gate or parking location to a turning location. Once the aircraft clears the ramp area and is in a position to begin forward movement, the tow vehicle is usually detached before the aircraft's engines are started, although one engine may be started prior to or during pushback in some situations. These maneuvers must all be accomplished according to specifically defined procedures that often prevent the cockpit crew from being able to maintain optimum awareness of other aircraft, vehicles, and persons in the aircraft's external environment. If one or more aircraft engines is also in operation, maintaining the kind of vigilance needed to avoid creating a safety hazard due to jet blast or engine ingestion is challenging. In addition, the aircraft must be completely stopped before some of the pushback procedures and checklists can be completed by the cockpit crew, delaying the pushback process and potentially blocking other aircraft from access to the ramp or gate area and increasing time spent by the aircraft on the ground.

With the method of the present invention, the cockpit crew has significant flexibility to perform departure, pushback, and takeoff procedures and complete checklists when the aircraft is stopped or when it is moving. The elimination of the need for both tow vehicles and operating aircraft engines during pushback allows pilots to complete the departure and pushback checklist while the aircraft is still at the gate, using ground power or the aircraft's APU power. Alternatively, these checklists can be "back loaded" and completed while the aircraft is away from the parking location, such as, for example, when the aircraft is near the runway or stopped in a runway queue, where there are substantially fewer ground vehicles and other aircraft than at the gate or parking location. The pilot and cockpit crew's heads can stay up and focused on the aircraft's external environment when situational awareness is most important and can stay down when the aircraft is stopped when focus on checklists and internal cockpit tasks is safest. Since the cockpit crew controls the ground maneuvering and travel of the aircraft through operation of the powered self-propelled drive wheel, movement through a congested ramp area can be accomplished more quickly, efficiently and safely than with a tow vehicle or the aircraft's engines. Additionally, when an aircraft is driven by a self-propelled drive wheel, pushback can be accomplished in significantly less space than is required for pushback maneuvers with a tug, which further enhances the safety of ramp operations, especially in congested airports.

Referring to the drawings, FIG. 1 illustrates one possible sequence of steps leading to enhanced pilot efficiency and aircraft safety according to the method of the present invention. These steps are discussed above and in connection with FIG. 2.

FIG. 2 illustrates a typical ground maneuver required upon departure of an aircraft 10 during pushback prior to takeoff. Only a single aircraft 10 and gate or airbridge 12 attached to an airport terminal 14 are shown. A more common situation in most airports would also include multiple gates and aircraft, as well as ground vehicles, including baggage and fuel trucks, personnel to handle baggage and fuel the aircraft, and personnel to guide the aircraft during arrival and pushback. Tow vehicles and operators would also be included. The aircraft 10 is equipped with at least one powered self-propelled drive wheel at 24 as described below. While the aircraft 10 is parked at the gate 12, as discussed above, the cockpit crew can use ground power or the aircraft's APU to complete the appropriate checklist, possibly prior to or during passenger boarding. Once the aircraft has been approved for pushback, the pilot can activate the powered self-propelled drive wheel to move the aircraft in reverse along the path 16 shown in FIG. 2. Having completed the checklist or postponed its completion, the pilot and cockpit crew will be able to keep their focus entirely on the external aircraft environment and to communicate more effectively with the ground control personnel (not shown) typically used to guide an aircraft during pushback. As during travel to the gate upon arrival, the pilot can maneuver the aircraft without having to consider the additional hazard area produced by operating aircraft engines. Jet blast, engine ingestion, and foreign object debris have been effectively eliminated from consideration.

When the aircraft 10 has traveled in reverse to a suitable location, such as point 18, where it is safe to move in a forward direction, the pilot controls the powered self-propelled drive wheel to move the aircraft forward along path 20 to a taxiway, represented by arrow 22, where it is safe to start the aircraft engines and complete procedures required for takeoff. If checklist completion was not done at the gate 12, but has been back loaded or postponed, this could be done at any suitable point along the aircraft's travel path where the aircraft is required or able to stop for a time sufficient to complete this task. The pilot and cockpit crew have significantly more control over pushback with the method of the present invention. It is, moreover, a faster, more efficient, and safer process than in the past, which further increases pilot efficiency.

The method of the present invention employs an aircraft with at least one powered, self-propelled aircraft drive wheel (indicated at 24 in FIG. 2) so a pilot can effectively move the aircraft on the ground between landing and takeoff without the use of the aircraft's engines or tow vehicles. An aircraft useful in the method of the present invention is equipped with at least one drive wheel powered by a controllable onboard electric drive motor capable of moving the aircraft independently as required on the ground between landing and takeoff. An electric drive motor preferred in the present method will be mounted in driving relationship with one or more of the aircraft wheels to move the wheels at a desired speed and torque. Electric drive motors useful for this purpose may be selected from those known in the art. One drive motor preferred for this purpose is a high phase order electric motor of the kind described in, for example, U.S. Pat. Nos. 6,657,334; 6,838,791; 7,116,019; and 7,469,858, all of which are owned in common with the present invention. A geared motor, such as that shown and described in U.S. Pat. No. 7,469,858, is designed to produce the torque required to move a commercial sized aircraft at an optimum speed for ground movement. The disclosures of the aforementioned patents are incorporated herein by reference. Any form of electric motor capable of driving an aircraft on the ground, including but not limited to electric induction motors, permanent magnet brushless DC motors, and switched reluctance motors may also be used. Hydraulic pump/motor assemblies and pneumatic motors may, in addition, be suitable for powering an aircraft drive wheel. Other motor designs capable of high torque operation across a required speed range that can be integrated into an aircraft drive wheel to function as described herein may also be suitable for use in enhancing pilot efficiency and increasing aircraft safety according to the method of the present invention.

The location of an aircraft self-propelled powered drive wheel motor in the method of the present invention will preferably be in or adjacent to one or both of the aircraft's nose gear wheels in the forward end of the aircraft 10, indicated at 24 in FIG. 2. Other onboard drive wheel locations, however, are also contemplated to be within the scope of the present invention. The wheel drive motor could additionally be located within an aircraft gear wheel assembly, within the aircraft hold, or in another location remote from the wheel and provided with the required connections to drive a wheel from one of these remote locations. One or more of the aircraft's main gear wheels could also be equipped with a powered electric driver to improve pilot efficiency in accordance with the present invention.

Although aircraft types and performance characteristics vary and flight deck procedures and cockpit levels of automation differ widely, pilot efficiency and aircraft safety can be enhanced and improved by the method of the present invention when an aircraft is driven on the ground independently of the engines by a powered self-propelled drive wheel in accordance with the present method.

INDUSTRIAL APPLICABILITY

The method of the present invention will find its primary applicability where it is desired to improve and enhance pilot and cockpit crew efficiency and aircraft safety while an aircraft is maneuvered on the ground without the operation of the aircraft engines between landing and takeoff.

The invention claimed is:

1. A method for improving safety and efficiency of aircraft cockpit operations and pushback in an aircraft equipped with at least one powered self-propelled drive wheel controllable to drive the aircraft on the ground without operation of aircraft main engines or attachment to a tow vehicle, comprising:
   a. equipping the aircraft with the at least one electric powered self-propelled drive wheel controllable from the aircraft's cockpit by the aircraft's pilot or cockpit crew to control ground travel of the aircraft without operation of aircraft main engines or attachment to a tow vehicle;
   b. while the aircraft is parked at a gate, determining a time during the aircraft's travel to a takeoff taxiway when selected aircraft departure and pushback procedures or checklists can be performed to enhance efficiency and safety of aircraft ground travel and cockpit operations;
   c. completing appropriate selected procedures or checklists while the aircraft is parked at the gate using ground power or an auxiliary power unit;
   d. after the aircraft is approved for pushback, activating the at least one electric powered self-propelled drive wheel and controlling movement of the aircraft in reverse away from the gate while the pilot and crew maintain heads up and focus on the aircraft external environment during aircraft movement to a selected safe location away from the gate, and performing additional appropriate selected procedures or checklists while the aircraft is stopped at the selected safe location; and
   e. controlling movement of the aircraft in a forward direction and, if any additional appropriate procedures or checklists have not been performed, performing the additional appropriate procedures or checklists at a safe time or location, comprising when the aircraft is stopped near a runway or in a runway queue, wherein when all appropriate procedures or checklists have been performed, the pilot controls the at least one electric powered self-propelled drive wheel to move the aircraft forward to a takeoff taxiway location where aircraft main engines are safely started and the aircraft takes off.

2. The method described in claim 1, further comprising
   a. equipping the aircraft with electric powered self-propelled drive wheel assemblies mounted in nose wheels activatable and controllable from the aircraft's cockpit by the pilot or cockpit crew; and
   b. when the aircraft has taken off and then landed, at a selected taxi speed eliminating operation of aircraft engines and activating and controlling the electric powered self-propelled drive wheel assemblies to drive the aircraft safely in a forward direction to a parking location with pilot and crew heads up while maintaining improved pilot situational awareness of and focus on the aircraft external environment while driving the aircraft on the ground and performing arrival checklist tasks at a location that enhances safety of cockpit operations.

3. The method described in claim 1, further comprising completing any selected aircraft departure and pushback procedures or checklists not completed at the gate when the aircraft is stopped at the selected safe location.

4. The method described in claim 1, further comprising completing any selected aircraft departure and pushback procedures or checklists not completed at the selected safe location when the aircraft is stopped near a runway.

5. The method described in claim 1, further comprising completing any selected aircraft departure and pushback procedures or checklists not completed at the selected safe location when the aircraft is stopped in a runway queue.

* * * * *